No. 821,044. PATENTED MAY 22, 1906.
B. G. LAMME.
INDUCTION MOTOR.
APPLICATION FILED FEB. 27, 1904.
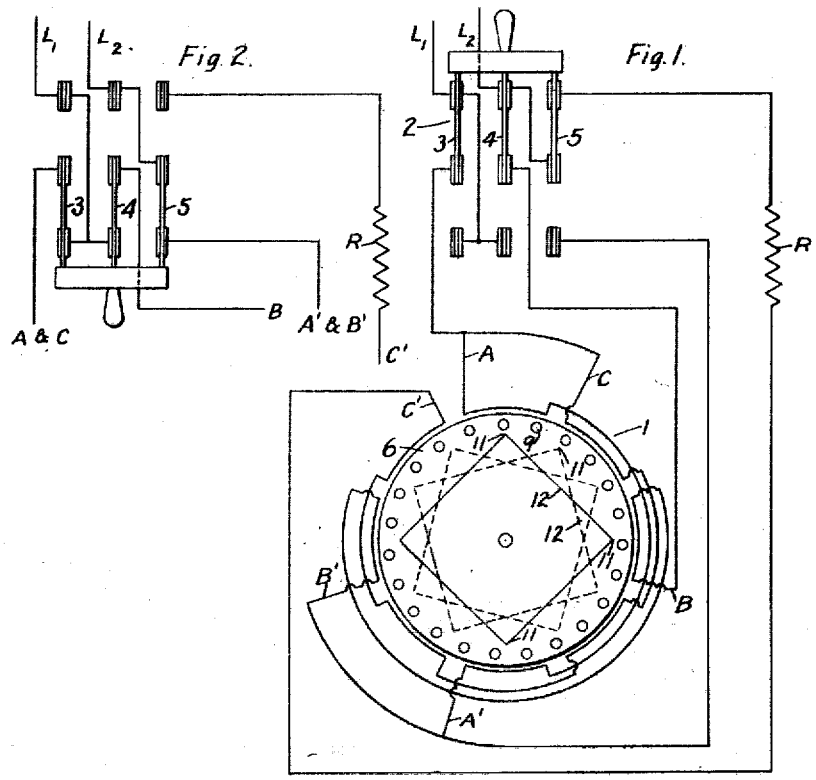
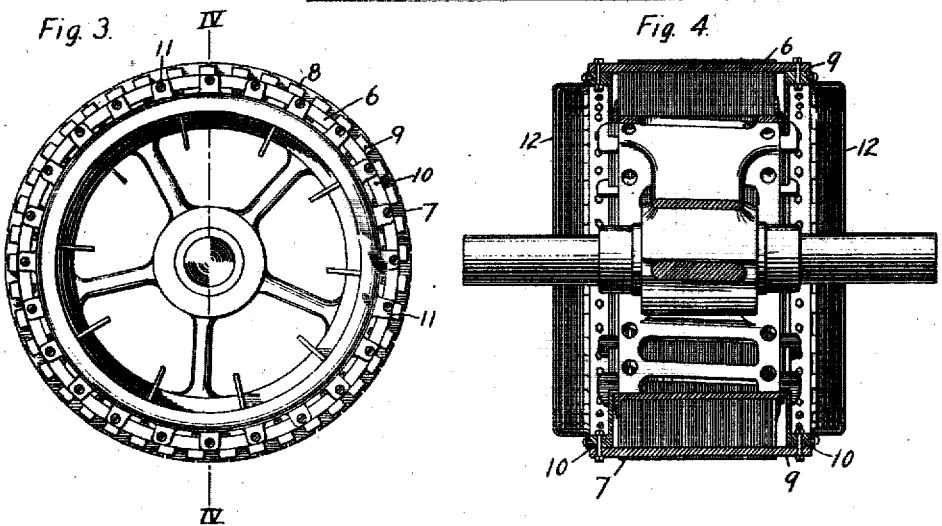
WITNESSES:
Fred. H. Miller
Otto S. Schairer
INVENTOR
Benjamin G. Lamme
BY
ATTORNEY.

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

INDUCTION-MOTOR.

No. 821,044.        Specification of Letters Patent.        Patented May 22, 1906.

Application filed February 27, 1904. Serial No. 1

*To all whom it may concern:*

Be it known that I, BENJAMIN G. LAMME, a citizen of the United States, and a resident of Pittsburg, in the county of Allegheny and State of Pennsylvania, have invented a new and useful Improvement in Induction-Motors, of which the following is a specification.

My invention relates to alternating-current motors, and it has for its object to provide secondary windings for induction-motors which shall have high resistance while the motor is starting and relatively low resistance while the motor is running.

It has been proposed to provide an induction-motor with a primary winding in two portions which may be connected in series for starting the motor and in parallel for running, the number of magnetic poles induced by the winding being thereby changed. It has also been proposed to provide such a motor with an auxiliary winding which is either of high resistance itself or has an external high resistance in series with it and is connected in parallel with the main winding in starting the motor. Such a motor or any other motor using the divided circuit or split-phase arrangement is practically a polyphase machine when starting and conforms to the laws governing starting conditions of such motors.

It is generally understood that a polyphase motor requires a higher secondary resistance when starting than when running in order to insure a large starting torque. In a single-phase motor it is still more important that the secondary winding have a relatively low resistance when running, since the maximum torque or "pull-out" torque of the motor is dependent upon the amount of resistance in the secondary circuit, while in a polyphase motor the pull-out torque is independent of such resistance.

Since a single-phase motor such as I have referred to is a polyphase motor at the start, it should have for economical starting a secondary winding of relatively high resistance and for running a secondary winding of comparatively low resistance in order to obtain the desired pull-out torque. It follows, therefore, that if a secondary winding can be so designed that it will have a high resistance under starting conditions and a low resistance when the motor is running, without the employment of variable resistance or short-circuiting devices, it will furnish an ideal construction for induction-motors. This condition cannot readily be obtained if the same number of primary magnetic poles is used in starting as in running; but if the number of poles in starting is different from that when running an arrangement of secondary winding provided by my present invention can be adopted which will give circuits having different resistances for starting and running, due to the fact that the secondary circuits are different for different numbers of magnetic poles in the primary member.

My invention is illustrated in the accompanying drawings, in which—

Figure 1 is a diagrammatic view of the windings of an induction-motor constructed in accordance therewith. Fig. 2 is a diagrammatic view of the governing switch in the position required for running conditions of the motor. Fig. 3 is a view in end elevation of a secondary member, showing the details of construction; and Fig. 4 is a sectional view on line IV IV of Fig. 3.

In Fig. 1 the primary windings A A', B B', and C C' of the motor 1 are connected by means of a three-pole double-throw switch 2 for starting conditions of the motor. Single-phase energy is supplied to the main primary winding by means of the circuit from the line conductor L' through the switch-blade 3, windings A A' and B' B, switch-blade 4 to line conductor L² and to the auxiliary winding by means of the circuit from line conductor L', switch-blade 3, windings C C', resistance R, switch-blade 5 to the line conductor L². 2X poles are induced by this arrangement of windings; but if the switch is in the position shown in Fig. 2 the current is reversed in the portion B B' of the main winding and X poles are then induced by the main primary winding, the auxiliary winding C C', and its connected resistance R being thrown out of circuit.

The secondary member 6 comprises a core 7, having slots 8, bar-conductors 9, having ends projecting beyond the ends of the core and relatively high resistance end rings 10, connected, respectively, to the ends of all of the conducting-bars 9. For starting conditions of the motor or for the larger number of magnetic poles the secondary circuits have comparatively high resistance, due to the resistance of the end rings.

At points 11, corresponding approximately to the polar pitch when the primary winding is connected for the smaller number of poles or for running conditions of the motor, low-resistance connectors 12 are attached. The secondary circuits for running conditions of the motor are then through the bars to the end rings 10 and through the nearest low-resistance connectors 12. By this very simple means low-resistance secondary circuits are provided for the motor under running conditions and relatively high resistance secondary circuits for starting conditions.

The secondary member may be designed for use with either single phase or polyphase windings on the primary member, and as many low-resistance connectors 12 may be employed as are desired. The low-resistance connectors may be attached to the high-resistance end rings or they may be attached directly to the bar-conductors 9, though it will generally be found most expedient to connect them to the high-resistance end rings, the increased resistance introduced in the secondary circuits by so doing being relatively small, as the length of this high-resistance path is short. The greater the number of low-resistance connectors or end rings the shorter will be the high-resistance part of the path.

While I have illustrated and described my invention as embodied in a motor having 2X primary magnetic poles when starting and X primary magnetic poles when running, I desire it to be understood that any other suitable ratio may be adopted and that the details of construction may be otherwise considerably modified without departing from my invention.

I claim as my invention—

1. In an alternating-current motor, the combination with a primary member having a winding adapted to produce a plurality of numbers of magnetic poles and means for changing from one number of poles to another, of a secondary member comprising a slotted core, conducting-bars in the core-slots, a high-resistance body or element that is so connected to said conducting-bars as to be effective when the primary winding produces the larger number of poles, and a low-resistance body or element that completes the secondary circuits when the primary winding produces the smaller number of poles.

2. In an alternating-current motor, the combination with a primary member having a winding adapted to produce a plurality of numbers of magnetic poles and means for changing from one number of poles to another, of a secondary member comprising a slotted core, conducting-bars in the core-slots, a high-resistance body or element that is connected to all of said bars and to complete the secondary circuits corresponding to the larger number of poles, and a low-resistance body or element that is connected to only a few of said bars to complete the secondary circuits corresponding to the smaller number of poles.

3. In an alternating-current motor, the combination with a primary member having a winding adapted to produce a plurality of numbers of magnetic poles and means for changing from one number of poles to another, of a secondary member comprising a slotted core, conducting-bars in the core-slots, high-resistance end rings connected to all of said bars and low-resistance end rings connected to the high-resistance end rings at a number of points corresponding to a definite number of magnetic poles.

4. In an alternating-current motor, the combination with a primary member having a winding adapted to produce a plurality of numbers of magnetic poles and means for changing from one number of poles to another, of a secondary member comprising a slotted core, conducting-bars in the core-slots, high-resistance end rings connected to all of said bars and adapted, in connection with said bars, to form a high-resistance winding suitable for the larger number of primary magnetic poles, and low-resistance end rings connected to the conducting-bars so as to form a low-resistance winding for a smaller number of magnetic poles.

5. In an alternating-current motor, the combination with a primary member having a winding adapted to produce NX or X magnetic poles and means for changing from one number of poles to the other, of a secondary member comprising a slotted core, conducting-bars in the core-slots, high-resistance end rings connected to all of said bars and adapted, in connection therewith, to form a high-resistance winding suitable for NX primary magnetic poles and low-resistance end rings connected with the conducting-bars so as to form a low-resistance winding for X magnetic poles.

6. In an alternating-current motor, the combination with a primary member having a winding adapted to produce a plurality of numbers of magnetic poles and means for changing from one number of poles to another, of a secondary member comprising a slotted core, conducting-bars in the core-slots, high-resistance rings connected respectively to the ends of all of said bars and low-resistance rings connected with said bars at intervals such that they become effective conductors only when a definite number of magnetic poles are induced by the primary member of the motor.

7. In an alternating-current motor, the combination with a primary member having a winding adapted to produce a plurality of numbers of magnetic poles and means for changing from one number of poles to another, of a secondary member comprising a slotted core, conducting-bars in the core-slots, high-resistance rings connected respectively to the ends of all of said bars and low-resistance rings connected with said bars at such intervals as to become effective conductors only when a number of magnetic poles corresponding to full-speed running condition of the motor are induced by the primary member of the motor.

8. In an alternating-current motor, the combination with a primary member having a winding adapted to produce a plurality of numbers of magnetic poles and means for changing from one number of poles to another, of a secondary member comprising a core, longitudinally-disposed conductors, high-resistance elements connected to the ends of all of said conductors and low-resistance elements that are connected to the ends of such conductors as will make them effective portions of the secondary circuits when the smaller number of poles is produced by the primary winding.

In testimony whereof I have hereunto subscribed my name this 12th day of February, 1904.

BENJ. G. LAMME.

Witnesses
ELISABETH M. STEWART,
BIRNEY HINES.